US012647145B2

(12) United States Patent
  Van Wegberg

(10) Patent No.: US 12,647,145 B2
(45) Date of Patent: Jun. 2, 2026

(54) METHOD AND SYSTEM FOR PROCESSING AN ANALOG SIGNAL

(71) Applicant: Stichting IMEC Nederland, Eindhoven (NL)

(72) Inventor: Roland Van Wegberg, Oss (NL)

(73) Assignee: Stichting IMEC Nederland, Eindhoven (NL)

( * ) Notice: Subject to any disclaimer, the term of this patent is extended or adjusted under 35 U.S.C. 154(b) by 283 days.

(21) Appl. No.: 18/531,318

(22) Filed: Dec. 6, 2023

(65) Prior Publication Data

US 2024/0195445 A1 Jun. 13, 2024

(30) Foreign Application Priority Data

Dec. 8, 2022 (EP) .................................... 22212155

(51) Int. Cl.
  *H04B 1/10* (2006.01)
  *H04B 1/16* (2006.01)
(52) U.S. Cl.
  CPC ............. *H04B 1/1027* (2013.01); *H04B 1/16* (2013.01)
(58) Field of Classification Search
  CPC ........... H04B 1/1027; H04B 1/16; H03F 1/26; H03F 3/181; H03F 3/38
  See application file for complete search history.

(56) References Cited

FOREIGN PATENT DOCUMENTS

LU 101199 B1 8/2019

OTHER PUBLICATIONS

CN 109450384 A, Ma et al, Mar. 8, 2019, Fig 2 (Year: 2019).*
CN 102077467 A, Pan et al, May 25, 2011, fig 4 (Year: 2011).*
Extended European Search Report and Search Opinion, Application No. EP 22212155.0, mailed May 25, 2023, 12 pages.
Belloni, Massimiliano, Edoardo Bonizzoni, Franco Maloberti, and Andrea Fornasari. "Low-power ripple-free chopper amplifier with correlated double sampling de-chopping." In Proceedings of 2010 IEEE International Symposium on Circuits and Systems, pp. 765-768. IEEE, 2010.
Enz, Christian C., Gabor C. Temes. Imperfections, Op-Amp. "Circuit techniques for reducing the effects of op-amp imperfections: autozeroing, correlated double sampling, and chopper stabilization." Proceedings of the IEEE 84, No. 11 (1996).

(Continued)

*Primary Examiner* — Curtis A Kuntz
(74) *Attorney, Agent, or Firm* — McDonnell Boehnen Hulbert & Berghoff LLP

(57) ABSTRACT

Example embodiments relate to methods and systems for processing analog signals. One example method for processing an analog signal includes modulating the analog signal using a chopping signal with a chopping frequency $f_{chop}$ to generate a modulated signal. The method also includes amplifying the modulated signal to generate an amplified signal. Additionally, the method includes low-pass filtering the amplified signal to generate a filtered signal that includes at least one harmonic of the modulated signal. Further, the method includes sub-sampling the filtered signal and performing a correlated double sampling operation by subtracting samples at the chopping frequency.

18 Claims, 6 Drawing Sheets

100

(56)                  References Cited

OTHER PUBLICATIONS

Bilotti, Alberto, and Gerardo Monreal. "Chopper-stabilized amplifiers with a track-and-hold signal demodulator." IEEE Transactions on Circuits and Systems I: Fundamental Theory and Applications 46, No. 4 (1999): 490-495.

Belloni, Massimiliano, Edoardo Bonizzoni, Andrea Fornasari, and Franco Maloberti. "A micropower chopper—CDS operational amplifier." IEEE Journal of Solid-State Circuits 45, No. 12 (2010): 2521-2529.

* cited by examiner

100

N = 1

N = 2

N = 2

N = 4

METHOD AND SYSTEM FOR PROCESSING AN ANALOG SIGNAL

CROSS-REFERENCE TO RELATED APPLICATIONS

The present application is a non-provisional patent application claiming priority to European Patent Application No. EP 22212155.0, filed Dec. 8, 2022, the contents of which are hereby incorporated by reference.

FIELD OF THE DISCLOSURE

The present disclosure relates to analog signal processing (e.g., to stabilize instrumentation amplifiers in the signal processing path using a chopper and a correlated double sampling scheme).

BACKGROUND

Generally, chopper-based stabilization of instrumentation amplifiers (IAs) may be performed to reduce the input direct current (DC) offset and low-frequency input noise that may degrade the performance of precision amplifiers. In this regard, the input signal may be first multiplied by a chopping signal, then may be amplified and may be multiplied again by a similar switching function, and finally may be low-pass filtered.

As a result, the first multiplication may translate the input signal spectrum into the high-frequency (HF) region and the second multiplication may recover the amplified original signal by demodulating the signal back to the baseband. On the other hand, the input-referred amplifier DC offset and low-frequency noise components may only go through the second multiplication process, and thus the DC offset may be converted into an HF component at the output and may be fully attenuated by the low-pass filter (LPF).

For example, the document M. Belloni et al., "A micro-power chopper-CDS operational amplifier," IEEE Journal of Solid-State Circuits, vol. 45, no. 12, pp. 2521-2529, December 2010 discloses a chopper technique for stabilizing an amplifier.

However, the LPF may use a low cut-off frequency and therefore may occupy an appreciable silicon area. Furthermore, for a high-precision channel containing a low-noise IA and an analog-to-digital converter (ADC), the above-mentioned chopper stabilization can be implemented in the channel for both the IA and the ADC.

In this regard, after the de-modulation of the IA, a bulky LPF may be used (e.g., before the signal can be sampled by the ADC). Moreover, due to the presence of the LPF, a buffer or a programmable gain amplifier (PGA) may be used in front of the ADC, which may add additional power consumption to the channel.

SUMMARY

Accordingly, the present disclosure provides a method and a system for processing an analog signal, while stabilizing an instrumentation amplifier in a sensing channel to facilitate a more relaxed low-pass filtration (i.e., size constrain), to reduce the overall power consumption, and further to improve the gain accuracy of the filtered signal.

The features of the first independent claim for the method and by the features of the second independent claim for the system provide for the above. The dependent claims contain further developments.

According to a first aspect of the present disclosure, a method for processing an analog signal is provided. The method comprises the steps of modulating the analog signal using a chopping signal with a chopping frequency $f_{chop}$ to generate a modulated signal, amplifying the modulated signal to generate an amplified signal, low-pass filtering the amplified signal to generate a filtered signal comprising at least one harmonic of the modulated signal, and sub-sampling the filtered signal and performing correlated double sampling operation by subtracting the samples at the chopping frequency.

In this regard, the correlated double sampling operation may correspond to a discrete time signal processing technique that may receive or select two samples (e.g., two opposite or phase-shifted samples) after the sub-sampling operation and may subtract the samples. The subtraction may eliminate the input-referred amplifier DC offset and/or low-frequency noise components, while the useful signal component may be doubled in amplitude.

Therefore, the modulation may up-convert the signal at the chopping frequency, whereby input-referred amplifier DC offset and low-frequency noise components may remain at the baseband or DC. Furthermore, instead of performing a second modulation with the chopping signal, the de-modulation may be performed by sub-sampling and further by a correlated double sampling by subtracting the samples (e.g., to facilitate filtering at or around the chopping frequency to extract the signal and to eliminate the noise components, such as high-pass filtering at or around the chopping frequency to filter out the noise components at the baseband or DC).

Moreover, the low-pass filtering of the amplified signal to include one or more harmonics, i.e., the chopping harmonics, may improve the gain accuracy (e.g., by sub-sampling the chopping harmonics). In some embodiments, the strict operational parameters, e.g., the low cut-off, for the low-pass filtration may be relaxed to facilitate compact filters as well as to eliminate the necessity of having buffers and/or PGAs before the analog-to-digital signal conversion.

In some embodiments, the method further comprises the step of generating a square wave of frequency $f_{chop}$ as the chopping signal (e.g., a unit symmetrical square wave of frequency $f_{chop}$ as the chopping signal).

In some embodiments, the method further comprises the step of low-pass filtering the amplified signal with a cutoff frequency of at least $3 \times f_{chop}$ (e.g., a cutoff frequency of $3.5 \times f_{chop}$). In addition, the method further comprises the step of sub-sampling the filtered signal with a sampling frequency of $N \times 2 \times f_{chop}$, where N is an integer.

In some embodiments, at least one higher order chopping harmonic, e.g., one higher order odd harmonic because of the square wave chopping signal, may be filtered along with the up-modulated signal at the chopping frequency, which may improve the gain accuracy of the signal and further may decrease the noise components due to sub-sampling of the signals and the noise components. For example, a low-pass filtering with a cutoff frequency of $3 \times f_{chop}$ may reduce the noise but give a higher gain error, whereas a low-pass filtering with a cutoff frequency of $4 \times f_{chop}$ may give a lower gain error but more noise.

In some embodiments, the method further comprises the step of applying sinc filtering and/or zero-order-hold to the samples before and/or after the correlated double sampling operation. For instance, the samples may be attenuated by a sinc filter and/or by a zero-order hold model based on the sampling frequency to reconstruct the original signal.

In some embodiments, the method further comprises the step of adding a gain factor in digital domain after performing the correlated double sampling operation. In some embodiments, for example, the gain accuracy can be further improved.

According to a second aspect of the present disclosure, a system for processing an analog signal is provided. The system comprises a chopper configured to modulate the analog signal using a chopping signal with a chopping frequency $f_{chop}$ to generate a modulated signal, an amplifier configured to amplify the modulated signal to generate an amplified signal, a low-pass filter configured to filter the amplified signal to generate a filtered signal comprising at least one harmonic of the modulated signal, an analog-to-digital converter configured to sub-sample the filtered signal, and a correlated double sampling block configured to perform correlated double sampling operation by subtracting the samples at the chopping frequency.

In some embodiments, the system further comprises a signal generator configured to generate a square wave of frequency $f_{chop}$ as the chopping signal.

In some embodiments, the low-pass filter is configured to filter the amplified signal with a cutoff frequency of at least $3 \times f_{chop}$ (e.g., a cutoff frequency of $3.5 \times f_{chop}$).

In some embodiments, the low-pass filter is further configured to settle before the sub-sampling of the filtered signal. In some embodiments, the low-pass filter may reduce or eliminate aliasing effects in the filtered signal.

In some embodiments, the analog-to-digital converter is configured to sub-sample the filtered signal with a sampling frequency of $N \times 2 \times f_{chop}$, where N is an integer.

In some embodiments, the analog-to-digital converter is a successive approximation register analog-to-digital converter. In some embodiments, for example, the overall power consumption can be further reduced.

In some embodiments, the correlated double sampling block is further configured to apply sinc filtering and/or zero-order-hold to the samples before and/or after the correlated double sampling operation. For example, the correlated double sampling block may attenuate the samples by a sinc filter and/or by a zero-order hold model based on the sampling frequency of the analog-to-digital converter to reconstruct the original signal.

In some embodiments, the correlated double sampling block is further configured to add a gain factor in a digital domain after performing the correlated double sampling operation.

In some embodiments, the amplifier is an instrumentation amplifier, and the analog signal is a sensor-generated signal (e.g., a micro-level signal). For example, the amplifier may be configured to measure physiological signals, such as but not limited to electrocardiogram (ECG) signals, electromyogram (EMG) signals, electroencephalogram (EEG) signals, pressure signals, impedance signals, and motion signals.

It is to be noted that the system according to the second aspect corresponds to the method according to the first aspect and its implementation forms. Accordingly, the system according to the second aspect achieves the same effects as the method of the first aspect and its respective implementation forms.

BRIEF DESCRIPTION OF THE DRAWINGS

Example embodiments of the present disclosure are now further explained with respect to the drawings by way of non-limiting example only. In the drawings:

4

Figure 1:
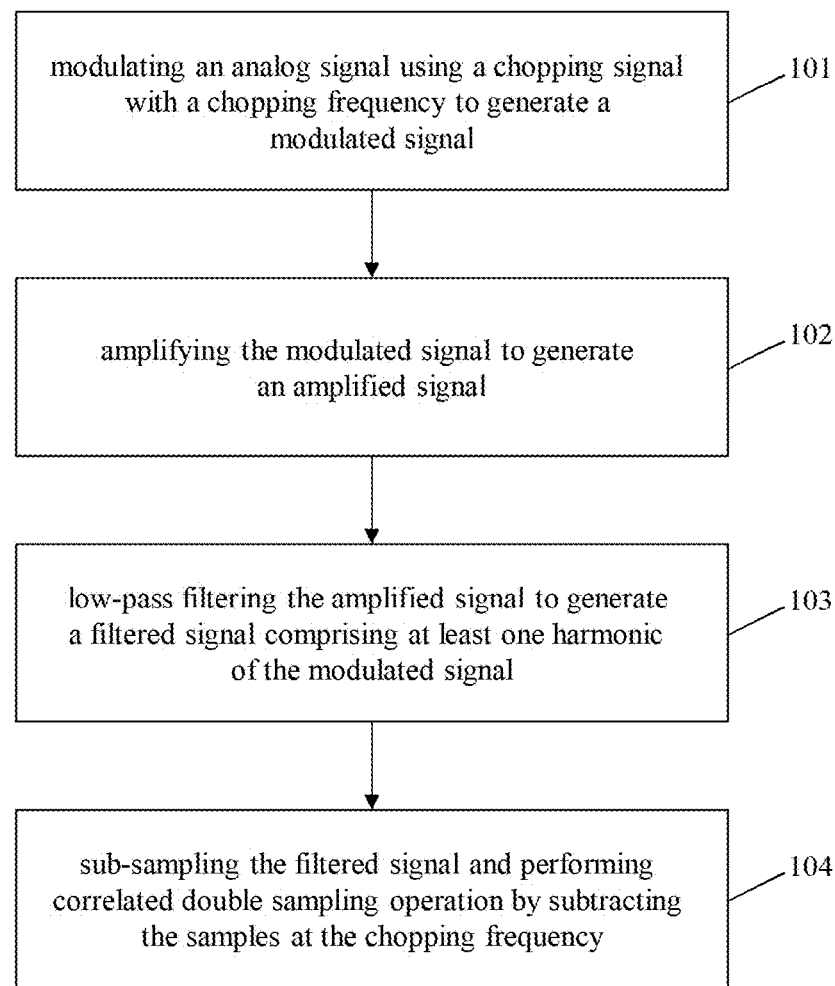

FIG. 1 shows a method, according to example embodiments.

Figure 2:
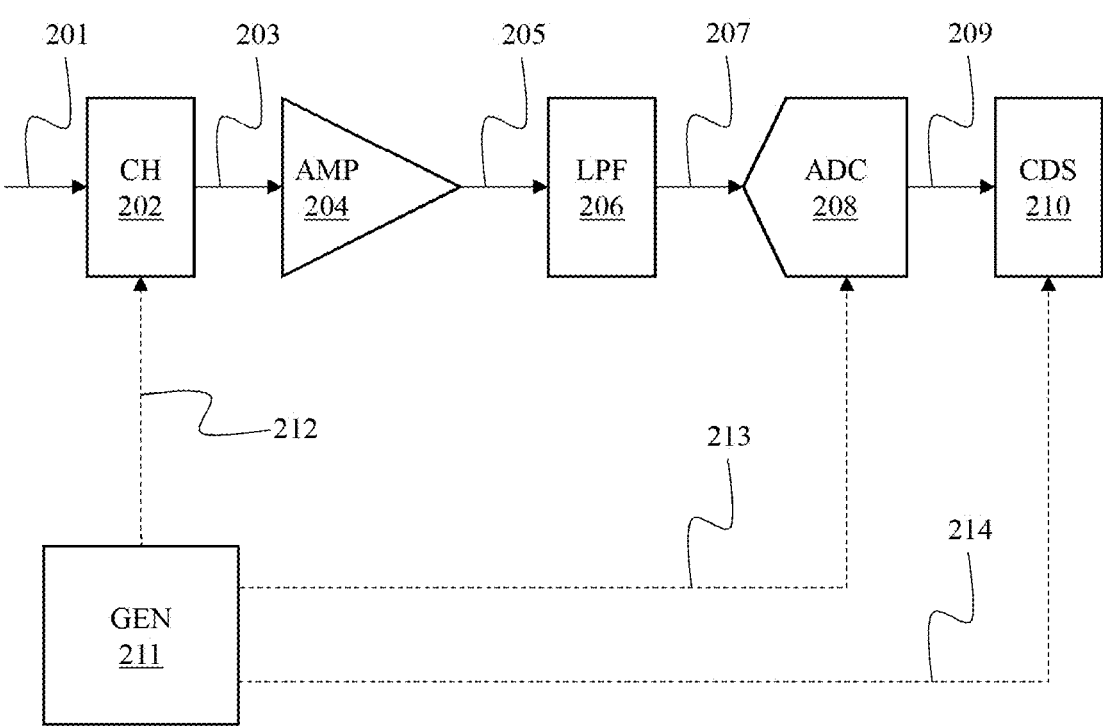

FIG. 2 shows a system, according to example embodiments.

Figure 3:
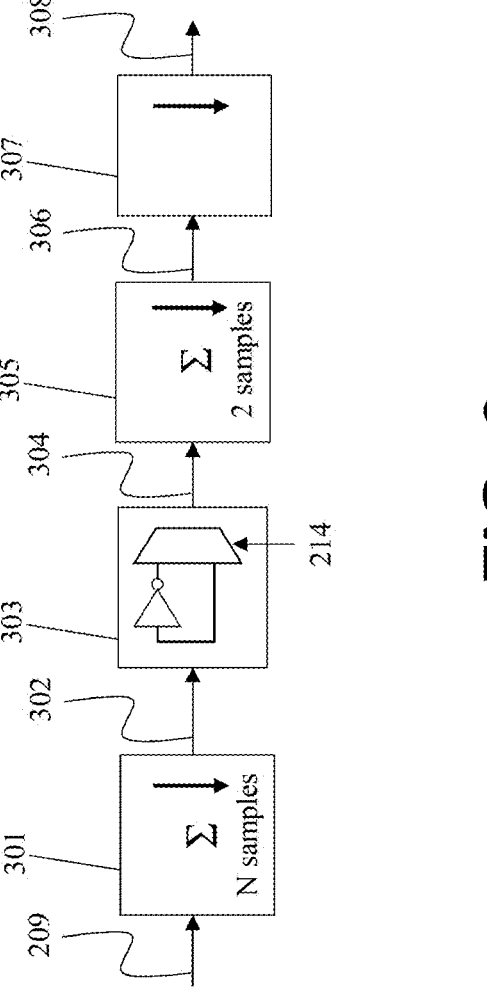

FIG. 3 shows a correlated double sampling block of FIG. 2, according to example embodiments.

Figure 4:
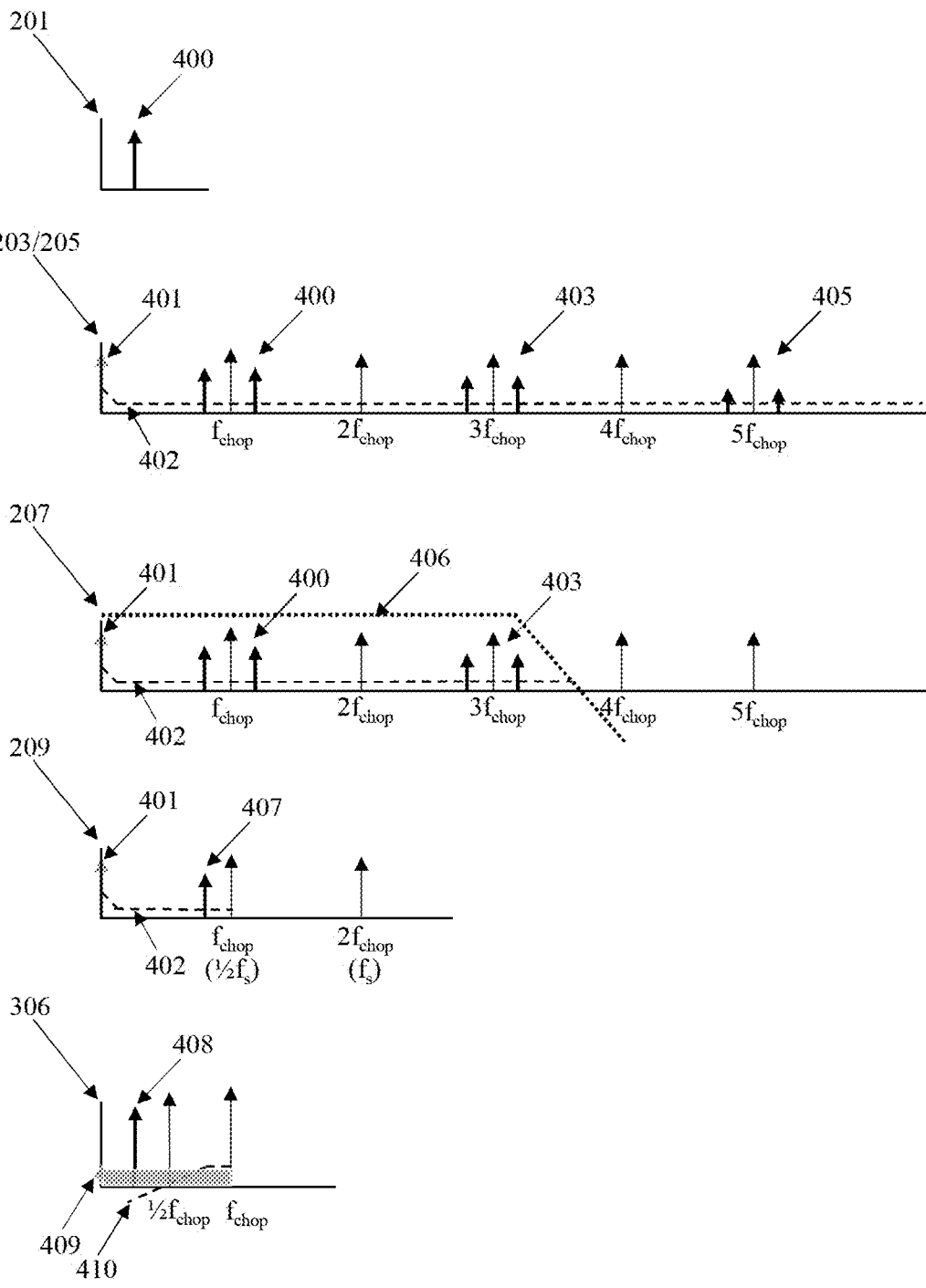

FIG. 4 shows a signal progression for the system of FIG. 2 in the frequency domain, according to example embodiments.

Figure 5:
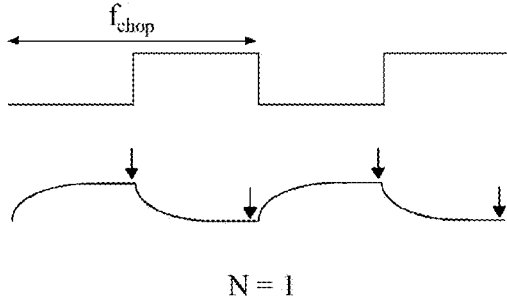
Figure 5:
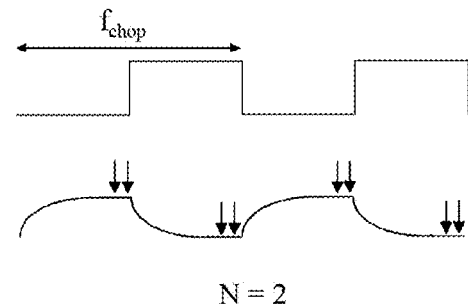
Figure 5:
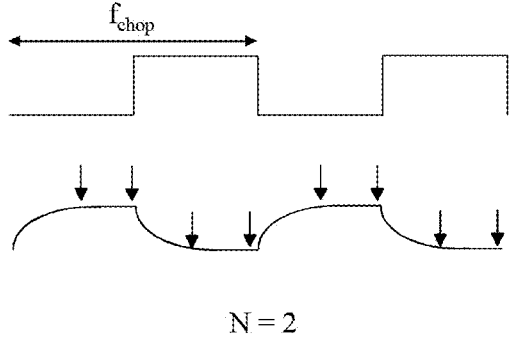
Figure 5:
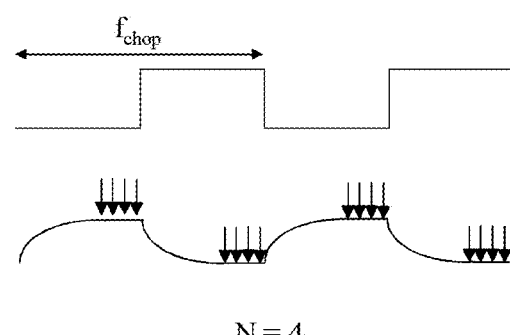

FIG. 5 shows sub-sampling schemes for the analog-to-digital converter of FIG. 2, according to example embodiments.

Figure 6:
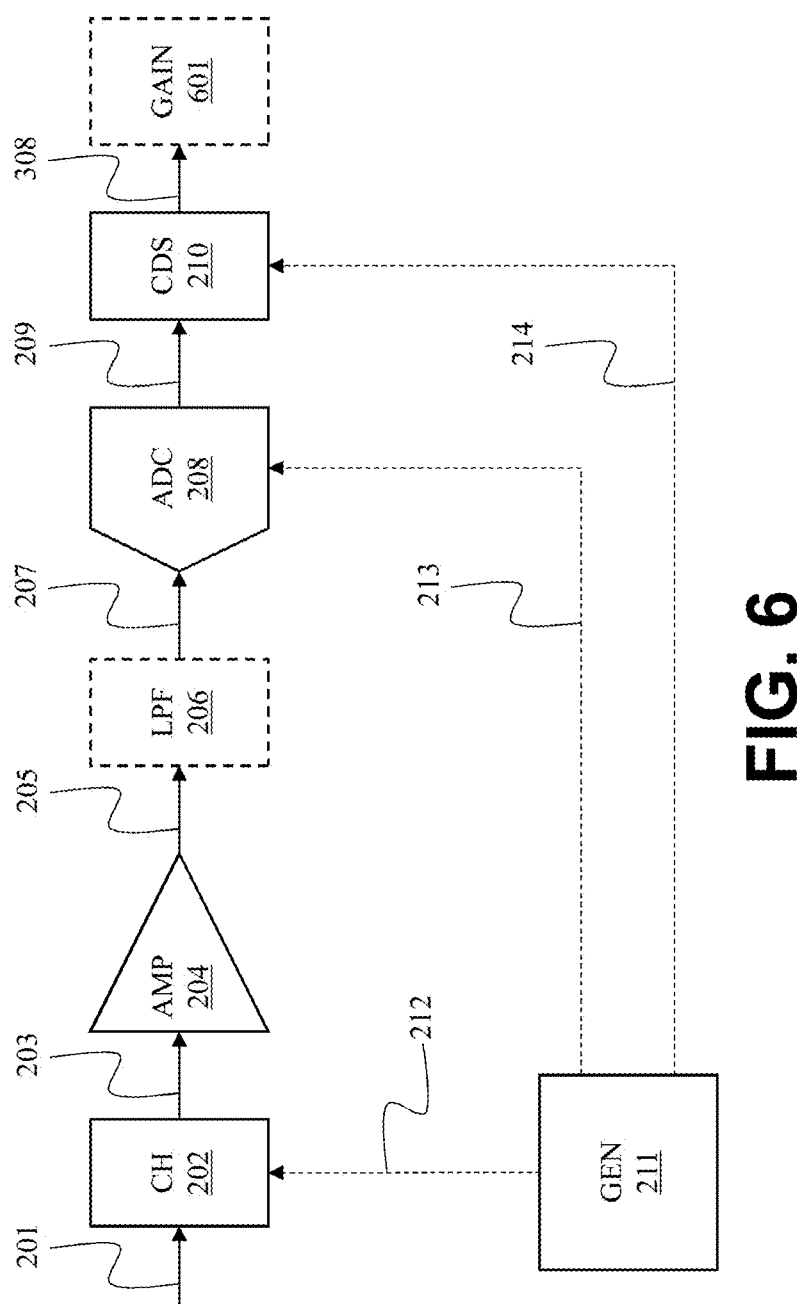

FIG. 6 shows a system, according to example embodiments.

DETAILED DESCRIPTION

Reference will now be made in detail to the embodiments of the present disclosure, examples of which are illustrated in the accompanying drawings. However, the following embodiments of the present disclosure may be variously modified and the range of the present disclosure is not limited by the following embodiments. Reference signs for similar entities in different embodiments are partially omitted.

In FIG. 1, an example embodiment of the method 100 according to the first aspect of the disclosure is illustrated. In a first step 101, an analog signal is modulated using a chopping signal with a chopping frequency to generate a modulated signal. In a second step 102, the modulated signal is amplified to generate an amplified signal. In a third step 103, the amplified signal is low-pass filtered to generate a filtered signal comprising at least one harmonic of the modulated signal. In a fourth step 104, the filtered signal is sub-sampled and correlated double sampling operation is performed by subtracting the samples at the chopping frequency.

In FIG. 2, a first example embodiment of the system 200 according to the second aspect of the present disclosure is illustrated. The system 200 may comprise devices (not shown) for receiving an analog signal 201 (e.g., a sensor-generated signal) and may provide a sensing channel or a readout channel in order to process the analog signal 201. The devices for receiving the analog signal 201 may comprise or be a sensor readout unit or circuitry or interface, for example, a Wheatstone bridge-based readout circuitry or any straightforward sensor-readout unit, circuitry, or interface. The devices for receiving the analog signal 201 may receive the analog signal 201 through a wired connection or wirelessly.

The system 200 may further comprise a chopper 202 that may receive the analog signal 201 and may modulate the analog signal 201 using a chopping signal 212 with a chopping frequency $f_{chop}$ to generate a modulated signal 203. In this regard, the term "chopper" should be understood as a multiplier or a modulator that may multiply or mix an input signal with a carrier signal in order to up-modulate or to shift the input signal from the baseband to the frequency of the carrier signal in the frequency spectrum including the generation of corresponding signal harmonics, e.g., due to the modulation with a square wave chopping signal.

The system 200 may further comprise an amplifier 204 operably coupled to the chopper 202. The amplifier 204 may receive the modulated signal 203 at one or more inputs of the amplifier 204 and may amplify the modulated signal 203 to generate an amplified signal 205. The amplifier 204 may be a band-limited amplifier having a bandwidth of about $35 \times f_{chop}$. Alternatively, the amplifier 204 may be designed to have a bandwidth based on the gain accuracy, e.g., a bandwidth lower than $35 \times f_{chop}$ that may increase the gain error. The amplifier 204 may introduce input-referred amplifier DC offset and low-frequency noise components, hereinafter referred as noise signal, while amplifying the modulated signal 203. The noise signal introduced by the amplifier 204 may remain at the baseband or at DC in the frequency spectrum.

The system 200 may further comprise a low-pass filter (LPF) 206 operably coupled to the amplifier 204. The LPF 206 may receive the amplifier signal 205 and may filter the amplified signal 205 to generate a filtered signal 207. The LPF 206 may have a cut-off frequency of about $3.5 \times f_{chop}$. As such, the filtered signal 207 may comprise one or more harmonic components or chopping harmonics present in the frequency spectrum due to the chopping operation.

For instance, the chopping signal 212 may be a square wave of frequency $f_{chop}$. As such, the modulated signal 203 generated by the chopper 202 may comprise the analog signal 201 at the chopping frequency $f_{chop}$, a first (odd) harmonic component at the frequency $3 \times f_{chop}$, a second (odd) harmonic component at the frequency $5 \times f_{chop}$ and so on in the frequency spectrum. As the LPF 206 may filter the amplified signal 205 with a cut-off frequency of about $3.5 \times f_{chop}$, the filtered signal 207 may comprise the noise signal at the baseband, the analog signal 201 at the chopping frequency $f_{chop}$, and the harmonic component at the frequency $3 \times f_{chop}$.

The system may further comprise an analog-to-digital converter (ADC) 208 operably coupled to the LPF 206. The ADC 208 may receive the filtered signal 207 and may perform sub-sampling of the filtered signal 207 to generate discrete samples 209. The ADC 208 may sub-sample the filtered signal 207 with a sampling frequency of $N \times 2 \times f_{chop}$, e.g., with a sampling frequency of $2 \times f_{chop}$ for sampling twice during one chopping period $T_{chop}$.

The system may further comprise a correlated double sampling (CDS) block 210 operably coupled to the ADC 208. The CDS block 210 may operate at the chopping frequency $f_{chop}$, may receive the samples 209 from the ADC 208, and may perform correlated double sampling operation by subtracting the samples 209 at the chopping frequency $f_{chop}$. For example, the ADC 208 may provide two samples corresponding to two opposite signal level instances or successive levels. The CDS block 210 may subtract the samples, which may eliminate the noise signal, however, the useful signal may be doubled in amplitude.

The system may further comprise a signal generator 211 operably coupled to the chopper 202, the ADC 208, and the CDS block 210. The signal generator 211 may generate the chopping signal 212 and may provide the chopping signal 212 to the chopper 202. The signal generator 211 may further generate the sub-sampling clock 213 and may provide the sub-sampling clock 213 to the ADC 208. The signal generator may further generate the CDS clock 214 and may provide the CDS clock 214 to the CDS block 210.

It is to be noted that the coupling between the above-mentioned entities (e.g., between the entities including the chopper 202, the amplifier 204, the LPF 206, and the ADC 208) may correspond to a single-ended connection or a differential connection.

In FIG. 3, an example embodiment of the CDS block 210 is illustrated. The CDS block 210 may comprise a first decimation block 301 that may receive the ADC samples 209 with a sampling frequency of $N \times 2 \times f_{chop}$ and may decimate or down-sample the samples 209 by N samples, thereby resulting the decimated samples 302 at a sampling frequency of $2 \times f_{chop}$. In this regard, the first decimation block 301 may perform a zero-order hold operation or sinc filtering to attenuate the ADC samples 209.

The CDS block 210 may further comprise a subtraction block 303 operably coupled to the first decimation block 301. The subtraction block 303 may operate at the chopping frequency $f_{chop}$, may receive the decimated samples 302 from the first decimation block 301, and may subtract the samples 302 at the chopping frequency $f_{chop}$ to generate subtracted samples 304.

The CDS block 210 may further comprise a second decimation block 305 operably coupled to the subtraction block 303. The second decimation block 305 may receive the subtracted samples 304 and may decimate or down-sample the samples 304 by 2 samples, thereby resulting the further decimated samples 306 at a sampling frequency of $f_{chop}$. In this regard, the second decimation block 305 may perform a zero-order hold operation or sinc filtering to attenuate the subtracted samples 304.

The CDS block 210 may further comprise a third decimation block 307 operably coupled to the second decimation block 305. The third decimation block 307 may receive the further decimated samples 306 and may decimate or down-sample the samples 304 to generate the output discrete signal 308 at a suitable frequency, e.g., 40 Hz. In this regard, the third decimation block 307 may perform a zero-order hold operation or sinc filtering to attenuate the further decimated samples 306.

In FIG. 4, an example signal progression for the system 200 (e.g., especially in the frequency domain) is illustrated. The signal 201 may correspond to the analog signal 201 comprising the frequency components 400 at the baseband. The signal 203/205 may correspond to the chopper output 203 or the amplifier output 205. The noise components 401 and 402 may correspond to the combination of the input-referred amplifier DC offset and low-frequency noise from the amplifier 204. The original baseband frequency components of the noisy modulated signal 203/205 are modulated and are shown at the odd harmonics, e.g., the frequency component 400 at $f_{chop}$, the frequency component 403 at $3 \times f_{chop}$, the frequency component 405 at $5 \times f_{chop}$, and so on.

The signal 207 may correspond to the filter output, i.e., the ADC input 207, where the LPF 206 may apply a cut-off frequency of $3.5 \times f_{chop}$, as shown by the filter band 406 (e.g., to include the noise components 401, 402 at the baseband), the frequency component 400 at $f_{chop}$, and the frequency component 403 at $3 \times f_{chop}$.

For example, the chopper 202 may up-modulate the analog signal 201 $A^*\cos(\omega_{in}t)$, where A is the signal amplitude and win is the signal frequency, e.g., with a square wave of $+1$ and $-1$. The Fourier expansion of the chopping signal 212 can be expressed as:

$$\frac{4}{\pi}\left\{\sin(\omega_{chop}t) + \frac{1}{3}\sin(3\omega_{chip}t) + \frac{1}{5}\sin(5\omega_{chop}t) + \ldots\right\}$$

where $\omega_{chop}$ is the chopping frequency.

The first term of the modulated signal 203 can be expressed as:

$$\frac{4}{\pi} * A * \left\{\frac{1}{2}\sin((\omega_{chip} - \omega_{in})t) - \frac{1}{2}\sin((\omega_{chop} + \omega_{in})t)\right\}$$

7

It can be understood that the amplitude $$\frac{4}{\pi} * A$$

A is greater than the original amplitude, and therefore, a gain error may arise.

The signal 209 may correspond to the ADC output 209, where the ADC 208 may operate at a sampling frequency of $2 \times f_{chop}$. In some embodiments, the ADC 208 may sub-sample all signals greater than $f_s/2$, which may result in the amplitude A due to the sub-sampling of the frequency component 400 at $f_{chop}$ and the frequency component 403 at $3 \times f_{chop}$, as shown by the frequency component 407, thereby reducing the gain error. Furthermore, the ADC 208 may sub-sample the noise components, e.g., the noise components at $2 \times f_{chop}$ to the baseband. Moreover, in order to eliminate aliasing, the LPF 206 may settle before the ADC 208 takes samples.

The signal 306 may correspond to the CDS block 210 output signal 306 of FIG. 3. The CDS block 210 may subtract the ADC samples at $f_{chop}$ to demodulate the frequency components 407 back to the baseband, as shown by the frequency component 408 (e.g., by providing band-pass filtration at $f_{chop}$). The noise component 401 at the baseband can be eliminated because of the high-pass filtration at or around $f_{chop}$ or $f_s/2$, and the noise component 402 can be eliminated or minimized by sample subtraction. The effective noise components at the CDS block 210 output are shown as the noise components 409 and 410, e.g., the noise component 409 may correspond to the attenuated DC offset of the amplifier 204.

In FIG. 5, example sub-sampling schemes for the ADC 208 are illustrated. For example, the ADC 208 may sub-sample the filtered signal 207 with a sampling frequency of $2 \times f_{chop}$, i.e., N=1. In this regard, the ADC 208 may take samples at the edges of the successive signal levels (top left figure). Accordingly, the CDS block 210 may subtract the two successive samples, e.g., with a zero-order hold at a sampling frequency of $f_{chop}$.

As a result of the subtraction and due to the constant level of the noise signal floor, the noise signal can be reduced, while at the same time due to the opposite nature of the actual signal component, the resultant signal may be doubled in amplitude. However, in this example (e.g., due to the sub-sampling of the noise components because of the band-limited anti-aliasing filtering of the LPF 206), the signal-to-noise ratio (SNR) may remain the same.

Alternatively, the ADC 208 may sub-sample the filtered signal 207 with a sampling frequency of $4 \times f_{chop}$, i.e., N=2. In this regard, the ADC 208 may take samples at the edges of the successive signal levels (top right figure).

Further alternatively, the ADC 208 may sub-sample the filtered signal 207 with a sampling frequency of $4 \times f_{chop}$, i.e., N=2. In this regard, the ADC 208 may take samples at different instances with a defined sampling span on the successive signal levels (bottom left figure).

Further alternatively, the ADC 208 may sub-sample the filtered signal 207 with a sampling frequency of $8 \times f_{chop}$, i.e., N=4. In this regard, the ADC 208 may take samples at the edges of the successive signal levels (bottom right figure) or may take samples at different instances with a defined sampling span on the successive signal levels (not shown).

In FIG. 6, a second example embodiment of the system 600 according to the second aspect of the present disclosure is illustrated. The system 600 may correspond to the system 200, e.g., the system 600 may comprise the chopper 202, the amplifier 204, the LPF 206, the ADC 208, the CDS block 210, and the signal generator 211. The system 600 may differ from the system 200 in that the system 600 may additionally comprise a gain block 601 (e.g., coupled to the CDS block 210) in order to apply a digital gain at the CDS block 210 output.

In this regard, the system 600 may omit the LPF 206, and the digital gain provided by the gain block 601 may be defined to reduce the gain error to improve the gain accuracy. Alternatively, the system 600 may include both the LPF 206 and the gain block 601 to further reduce the gain error, thereby further improving the gain accuracy.

It is important to note that, in the claims as well as in the description, the word "comprising" does not exclude other elements or steps and the indefinite article "a" or "an" does not exclude a plurality. A single element or other unit may fulfill the functions of several entities or items recited in the claims. Furthermore, the word "coupled" implies that the elements may be directly connected together or may be coupled through one or more intervening elements. Moreover, the description with regard to any of the aspects is also relevant with regard to the other aspects of the present disclosure.

Although the present disclosure has been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired for any given or particular application.

What is claimed is:

1. A method for processing an analog signal comprising: modulating the
   analog signal using a chopping signal with a chopping frequency fchop to generate a modulated signal;
   amplifying the modulated signal to generate an amplified signal;
   low-pass filtering the amplified signal with a cutoff frequency of at least 3×fchop to generate a filtered signal; and
   sub-sampling the filtered signal with a sampling frequency of at least 2×fchop and performing a correlated double sampling operation by subtracting samples at the chopping frequency.

2. The method according to claim 1, further comprising generating a square wave of frequency $f_{chop}$ as the chopping signal.

3. The method according to claim 1, wherein the cutoff frequency is at least 3.5×fchop.

4. The method according to claim 1, wherein the sampling frequency is N×2×fchop, where N is an integer.

5. The method according to claim 1, further comprising applying sinc filtering or zero-order-hold to the samples before or after performing the correlated double sampling operation.

6. The method according to claim 1, further comprising adding a gain factor in a digital domain after performing the correlated double sampling operation.

7. A system for processing an analog signal comprising: a chopper configured to modulate the analog signal using a chopping signal with a chopping frequency $f_{chop}$ to generate a modulated signal;

an amplifier configured to amplify the modulated signal to generate an amplified signal;

a low-pass filter configured to filter the amplified signal with a cutoff frequency of at least $3 \times f_{chop}$ to generate a filtered signal signal;

an analog-to-digital converter configured to sub-sample the filtered signal with a sampling frequency of at least $2 \times f_{chop}$; and a correlated double sampling block configured to perform a correlated double sampling operation by subtracting samples at the chopping frequency.

8. The system according to claim 7, further comprising a signal generator configured to generate a square wave of frequency $f_{chop}$ as the chopping signal.

9. The system according to claim 7, wherein the cutoff frequency is at least $3.5 \times f_{chop}$.

10. The system according to claim 7, wherein the low-pass filter is further configured to settle before the sub-sampling of the filtered signal.

11. The system according to claim 7, wherein the sampling frequency is $N \times 2 \times f_{chop}$, where N is an integer.

12. The system according to claim 7, wherein the analog-to-digital converter is a successive approximation register analog-to-digital converter.

13. The system according to claim 7, wherein the correlated double sampling block is further configured to apply sinc filtering or zero-order-hold to the samples before or after performing the correlated double sampling operation.

14. The system according to claim 7, wherein the correlated double sampling block is further configured to add a gain factor in digital domain after performing the correlated double sampling operation.

15. The system according to claim 7, wherein the amplifier is an instrumentation amplifier, and wherein the analog signal is a sensor-generated signal.

16. The system according to claim 15, wherein the analog signal is a micro-level signal.

17. A system comprising:

a sensor configured to generate an analog signal;

a chopper configured to modulate the analog signal using a chopping signal with a chopping frequency $f_{chop}$ to generate a modulated signal;

an amplifier configured to amplify the modulated signal to generate an amplified signal;

a low-pass filter configured to filter the amplified signal with a cutoff frequency of at least $3 \times f_{chop}$ to generate a filtered signal;

an analog-to-digital converter configured to sub-sample the filtered signal with a sampling frequency of at least $2 \times f_{chop}$; and a correlated double sampling block configured to perform a correlated double sampling operation by subtracting samples at the chopping frequency.

18. The system according to claim 17, wherein the analog signal is a micro-level signal.

\* \* \* \* \*